US012693484B2

(12) United States Patent
Sato et al.

(10) Patent No.: US 12,693,484 B2
(45) Date of Patent: Jul. 28, 2026

(54) OPTICAL FIBER CABLE AND CABLE WITH CONNECTOR

(71) Applicant: SUMITOMO ELECTRIC INDUSTRIES, LTD., Osaka (JP)

(72) Inventors: Fumiaki Sato, Osaka (JP); Ken Takahashi, Osaka (JP); Yuuki Shimoda, Osaka (JP); Toyoaki Kimura, Osaka (JP); Yohei Suzuki, Osaka (JP); Takemasa Akiyama, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/557,999

(22) PCT Filed: Apr. 19, 2023

(86) PCT No.: PCT/JP2023/015641
§ 371 (c)(1),
(2) Date: Oct. 30, 2023

(87) PCT Pub. No.: WO2024/218908
PCT Pub. Date: Oct. 24, 2024

(65) Prior Publication Data
US 2026/0029603 A1     Jan. 29, 2026

(51) Int. Cl.
G02B 6/44 (2006.01)
(52) U.S. Cl.
CPC ......... G02B 6/4434 (2013.01); G02B 6/4403 (2013.01); G02B 6/4436 (2013.01)

(58) Field of Classification Search
CPC ... G02B 6/4403; G02B 6/4434; G02B 6/4436
See application file for complete search history.

(56) References Cited

U.S. PATENT DOCUMENTS 6,137,936 A * 10/2000 Fitz ..................... G02B 6/4433
                                                        385/100
7,346,244 B2 * 3/2008 Gowan ............... G02B 6/4434
                                                        385/100
(Continued)

FOREIGN PATENT DOCUMENTS

CN        112485873  A      3/2021
JP      2007-041568  A      2/2007
(Continued)

OTHER PUBLICATIONS

One World Cable, "The Difference Between FRP and KFRP", Jun. 25, 2022, https://www.owcable.com/technology/the-difference-between-frp-and-kfrp/ (Year: 2022).*
(Continued)

*Primary Examiner* — Ryan A Lepisto
(74) *Attorney, Agent, or Firm* — McDonald Hopkins LLC

(57) ABSTRACT

An optical fiber cable includes a cable core including a plurality of optical fibers, at least one tensile strength member provided along the cable core, and a sheath configured to cover the cable core from an outside and enclose the tensile strength member. The tensile strength member is provided at one location on the sheath in a cross-sectional view. A core density obtained by dividing the number of the plurality of optical fibers by a cross-sectional area of the cable is 1.5 core/mm$^2$ or more.

16 Claims, 3 Drawing Sheets

(56)  References Cited

U.S. PATENT DOCUMENTS

| 8,467,650 | B2 * | 6/2013 | Overton | ................. | G02B 1/046 |
| | | | | | 385/100 |
| 8,548,294 | B2 * | 10/2013 | Toge | .................... | G02B 6/4433 |
| | | | | | 385/114 |
| 8,805,143 | B2 * | 8/2014 | Tatat | ..................... | G02B 6/441 |
| | | | | | 385/112 |
| 9,274,302 | B2 * | 3/2016 | Gimblet | .............. | G02B 6/4431 |
| 11,209,606 | B2 * | 12/2021 | Sato | ........................ | G02B 6/567 |
| 11,442,236 | B2 * | 9/2022 | Blazer | ................. | G02B 6/4432 |
| 11,762,161 | B2 * | 9/2023 | Sato | ......................... | G02B 6/52 |
| | | | | | 385/113 |
| 2011/0262148 | A1 * | 10/2011 | Weimann | ............. | G02B 6/4433 |
| | | | | | 385/112 |
| 2012/0020632 | A1 | 1/2012 | Shiobara et al. | | |
| 2019/0391352 | A1 | 12/2019 | Scarpaci et al. | | |
| 2020/0142144 | A1 * | 5/2020 | Blazer | ................. | G02B 6/4403 |
| 2021/0132314 | A1 | 5/2021 | Kikuchi et al. | | |
| 2021/0223491 | A1 | 7/2021 | Shimizu et al. | | |
| 2022/0171146 | A1 | 6/2022 | Shimizu | | |
| 2023/0258895 | A1 * | 8/2023 | Blazer | .................... | G02B 6/443 |
| | | | | | 385/102 |

FOREIGN PATENT DOCUMENTS

| JP | 2010-175706 | A | 8/2010 |
| JP | 2015-166806 | A | 9/2015 |
| JP | 2020-008612 | A | 1/2020 |
| JP | 2022-071079 | A | 5/2022 |
| JP | 2022-165364 | A | 10/2022 |
| WO | 96/15466 | A1 | 5/1996 |
| WO | 01/07953 | A1 | 2/2001 |
| WO | 2023/002971 | A1 | 1/2023 |

OTHER PUBLICATIONS

International Search Report dated Jun. 27, 2023 issued in PCT/JP2023/015641.

Written Opinion dated Jun. 27, 2023 issued in PCT/JP2023/015641.

\* cited by examiner

OPTICAL FIBER CABLE AND CABLE WITH CONNECTOR

TECHNICAL FIELD

The present disclosure relates to an optical fiber cable and a cable with a connector.

BACKGROUND ART

Patent Literature 1 discloses an optical fiber cable including a plurality of optical fibers, one tensile strength member, and a sheath that covers the plurality of optical fibers from the outside and that encloses the one tensile strength member. The one tensile strength member provides a tensile strength and an anti-buckling property for the cable while making bending of the cable relatively easy.

CITATION LIST

Patent Literature

Patent Literature 1: U.S. Pat. No. 6,137,936B

SUMMARY OF INVENTION

An optical fiber cable according to an aspect of the present disclosure including:
a cable core including a plurality of optical fibers;
at least one tensile strength member provided along the cable core; and
a sheath configured to cover the cable core from an outside and enclose the tensile strength member,
in which the tensile strength member is provided at one location on the sheath in a cross-sectional view, and
in which a core density obtained by dividing the number of the plurality of optical fibers by a cross-sectional area of the cable is 1.5 core/mm$^2$ or more.
A cable with a connector according to one aspect of the present disclosure, the cable including:
the optical fiber cable; and
a multi-fiber connector to which the plurality of optical fibers are attached at one end of the optical fiber cable.

DESCRIPTION OF EMBODIMENTS

Technical Problem

Figure 1:
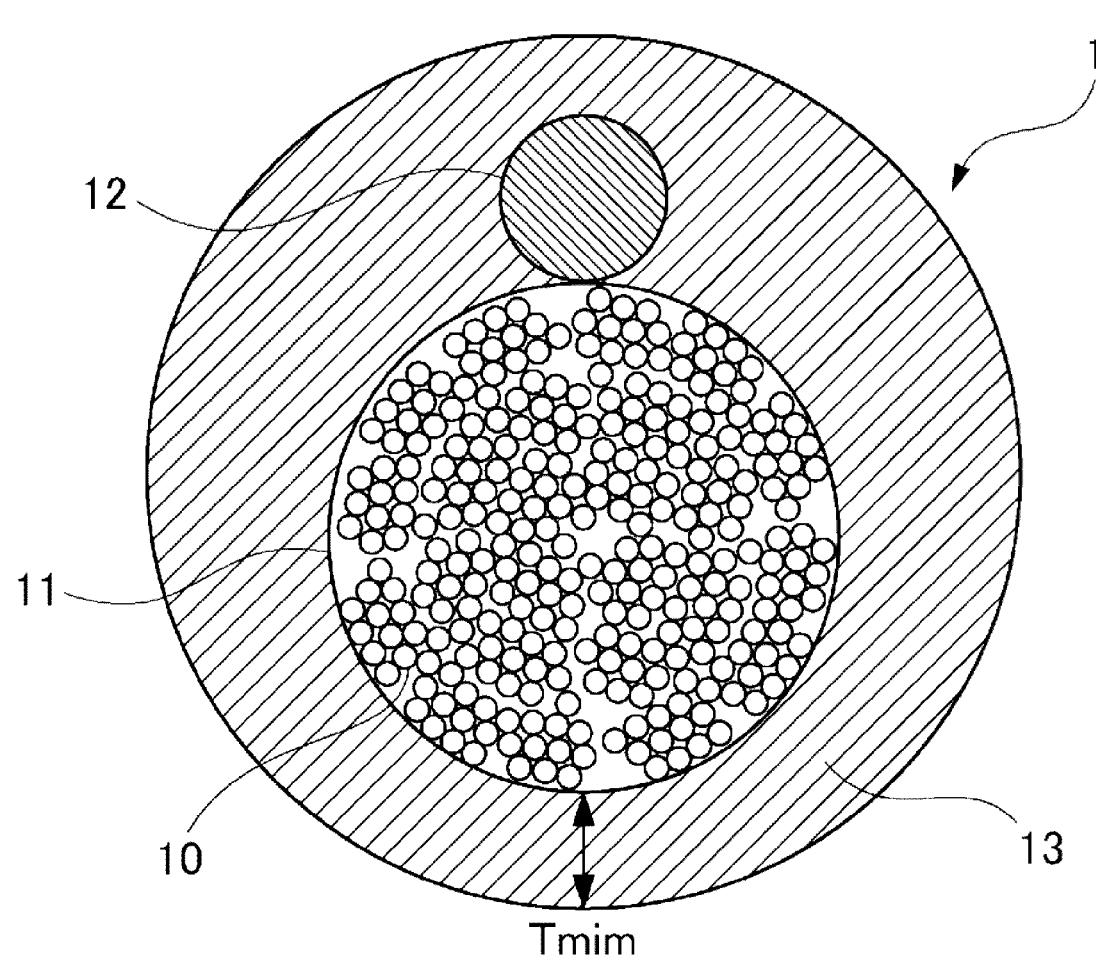
FIG. 1 is a cross-sectional view perpendicular to a longitudinal direction of an optical fiber cable according to an embodiment.

When an optical fiber cable has a structure with tensile strength members on both sides of a sheath around a cable core, the optical fiber cable tends to bend in a direction of 90 degrees with respect to a line connecting the tensile strength members in a cross-sectional view, and tends to have low bending rigidity in the direction. On the other hand, the optical fiber cable tends to be less likely to bend in a direction in which the tensile strength member is present, and tends to have high bending rigidity in the direction. That is, the optical fiber cable having the structure described above has bending anisotropy. Such an optical fiber cable is likely to bend in a direction of low bending rigidity when air is blown or pushed in a duct, and may buckle in the middle of the duct.

An optical fiber cable is also known in which tensile strength members are arranged
at equal intervals at four locations on a sheath in a cross-sectional view. However, in such an optical fiber cable, the distance between the tensile strength member embedded in the sheath and a bending center (in this case, the bending center coincides with a cable center) is large. Therefore, when the cable is bent to a small diameter, a compressive stress is applied to an inner side of the bend, and the tensile strength member provided inside is likely to buckle, break, and crush. Further, since it is difficult to bend the cable to a small diameter, a large space is required to store the cable.

It is preferable to reduce the diameter and weight of the optical fiber cable in order to mount the optical fibers at a high density, and the diameter of the optical fiber has also been reduced from 250 μm in the related art to 200 μm. In order to increase the density, it is useful to reduce the thickness of the sheath. However, when the sheath is thin, the tensile strength member provided inside is more likely to buckle when the cable is bent to a small diameter.

An object of the present disclosure is to provide an optical fiber cable and a cable with a connector, in which optical fibers can be mounted at a high density and in which a tensile strength member is less likely to buckle even when the cable is bent to a small diameter.

Description of One Embodiment of Present Disclosure

First, an embodiment of the present disclosure will be listed and described.

An optical fiber cable according to an aspect of the present disclosure including:
(1) a cable core including a plurality of optical fibers;
at least one tensile strength member provided along the cable core; and
a sheath configured to cover the cable core from an outside and enclose the tensile strength member,
in which the tensile strength member is provided at one location on the sheath in a cross-sectional view, and
in which a core density obtained by dividing the number of the plurality of optical fibers by a cross-sectional area of the cable is 1.5 core/mm$^2$ or more.

According to the present disclosure, it is possible to implement the optical fiber cable in which the optical fibers having a core density of 1.5 core/mm$^2$ or more are mounted at a high density. Further, in the present disclosure, the tensile strength member is provided at one location on the sheath in a cross-sectional view. The tensile strength member is embedded at one location. Accordingly, when the cable is bent, a bending center is closer to the tensile strength member, and the distance between the tensile strength member and the bending center is shortened. Therefore, as compared with a case in which the tensile strength member is embedded at two or more locations on the sheath, the tensile strength member is less likely to buckle even when the cable is bent to a small diameter. Since the cable is easily bent to a small diameter, the storability of the cable in any space is also improved.

(2) In the above (1), the tensile strength member may be fiber reinforced plastic (FRP).

According to the present disclosure, since the tensile strength member is FRP, the rigidity is relatively high, and the tensile strength member is less likely to buckle.

(3) In the above (1) or (2), a Young's modulus of the tensile strength member may be 400 MPa or more and 700 MPa or less.

According to the present disclosure, since the tensile strength member is provided at one location on the sheath and the Young's modulus of the tensile strength member is 400 MPa or more and 700 MPa or less, the rigidity of the tensile strength member is relatively low, and the tensile strength member is relatively flexible and is less likely to buckle. When the Young's modulus of the tensile strength member is less than 400 MPa, the function as a tensile strength member deteriorates, and the function as an anti-compression member against the shrinkage of the sheath deteriorates. On the other hand, when the Young's modulus of the tensile strength member exceeds 700 MPa, since the cable becomes difficult to bend, the storability deteriorates.

(4) In any one of the above (1) to (3), a product (so called as an ES product) of a Young's modulus and a cross-sectional area of the tensile strength member may be 1000 N or more and 10000 N or less.

According to the present disclosure, since the tensile strength member is provided at one location on the sheath and the ES product of the tensile strength member is 1000 N or more and 10000 N or less, the tensile strength member is less likely to buckle.

(5) In the above (1), the tensile strength member may be steel wire.

According to the present disclosure, since the tensile strength member is provided at one location on the sheath and the tensile strength member is steel wire, the rigidity is high and the tensile strength member is less likely to buckle.

(6) In any one of the above (1) to (5), a diameter of the tensile strength member may be larger than a minimum thickness of the sheath.

According to the present disclosure, since the tensile strength member is provided at one location on the sheath and the diameter of the tensile strength member is larger than the minimum thickness of the sheath, the center of rigidity of the cable is closer to the tensile strength member than is the center of the cable. Therefore, even when the cable is bent, the tensile strength member is less likely to buckle.

(7) In any one of the above (1) to (6), when the optical fiber cable is bent at a bending radius 10 times a radius of the optical fiber cable, the tensile strength member may not buckle.

Even when the cable is bent to a small diameter, it is possible to implement an optical fiber cable in which the tensile strength member is less likely to buckle.

(8) In any one of the above (1) to (7), the sheath may contain a flame-retardant inorganic material.

According to the present disclosure, since the sheath contains a flame-retardant inorganic material, an optical fiber cable having excellent flame retardance can be implemented.

(9) In any one of the above (1) to (7), the sheath may be an ethylene-vinyl acetate copolymer resin (so called as an EVA resin).

According to the present disclosure, since the sheath is an ethylene-vinyl acetate copolymer resin (an EVA resin), an optical fiber cable having excellent flame retardance can be implemented.

(10) In any one of the above (1) to (9), a Young's modulus of the sheath may be 400 MPa or more and 800 MPa or less.

According to the present disclosure, since the Young's modulus of the sheath is 400 MPa or more and 800 MPa or less, the cable is easily bent, and the storability of the cable in any space is improved.

(11) In any one of (1) to (10), a softening point temperature of the sheath may be 40 deg-C. or higher and 70 deg-C. or lower.

If the softening point temperature of the sheath is lower than 40 deg-C., the sheath is likely to soften even in a normal temperature environment, and the cable is likely to be deformed by a lateral pressure or the like. If the softening point temperature of the sheath is higher than 70 deg-C., the material becomes hard, and thus the transmission characteristic at a low temperature is likely to deteriorate due to low temperature shrinkage or the like. According to the present disclosure, since the softening point temperature of the sheath is 40 deg-C. or higher and 70 deg-C. or lower, it is possible to implement an optical fiber cable that is less likely to be deformed even when a lateral pressure or the like is applied and that has a good transmission characteristic even at a low temperature.

(12) In any one of the above (1) to (11), the tensile strength member may be helically provided around the cable core in a longitudinal direction of the optical fiber cable.

According to the present disclosure, since the tensile strength member is helically provided, the bending anisotropy is reduced, and the buckling of the cable is further prevented.

(13) In any one of the above (1) to (12), a ratio of an area of the tensile strength member to an area of the sheath in the cross-sectional view may be 0.04 or more.

If the ratio of the area of the tensile strength member to the area of the sheath is smaller than 0.04, the function as a tensile strength member deteriorates, and the function as an anti-compression member against the shrinkage of the sheath deteriorates. According to the present disclosure, since the ratio of the area of the tensile strength member to the area of the sheath is 0.04 or more, the tensile strength member is less likely to buckle.

(14) In any one of the above (1) to (13), the optical fiber cable may be a cable for air blown installation.

According to the present disclosure, it is possible to implement an optical fiber cable for air blown installation, in which optical fibers can be mounted at a high density and in which a tensile strength member is less likely to buckle even when the cable is bent to a small diameter.

A cable with a connector according to one aspect of the present disclosure, the cable including:

(15) the optical fiber cable according to any one of the above (1) to (14); and a multi-fiber connector to which the plurality of optical fibers are attached at one end of the optical fiber cable.

According to the present disclosure, the cable connection is facilitated.

Advantageous Effects of Present Disclosure

According to the present disclosure, it is possible to provide an optical fiber cable and a cable with a connector, in which optical fibers can be mounted at a high density and in which a tensile strength member is less likely to buckle even when the cable is bent to a small diameter.

Details of Embodiment of Present Disclosure

A specific example of an optical fiber cable according to an embodiment of the present disclosure will be described with reference to the drawings.

The present disclosure is not limited to these exemplifications, but is indicated by the scope of claims, and is intended to include all modifications within a scope and meaning equivalent to the scope of claims.

Structure of Optical Fiber Cable

An optical fiber cable 1 according to the present embodiment will be described with reference to FIG. 1. FIG. 1 is a cross-sectional view perpendicular to a longitudinal direction of the optical fiber cable 1.

As shown in FIG. 1, the optical fiber cable 1 includes a cable core 11, one tensile strength member 12, and a sheath 13. The optical fiber cable 1 has a circular shape in a cross-sectional view. The outer diameter of the optical fiber cable 1 is, for example, 9.8 mm. A press winding tape or a bundle string may be wound around the outer circumference of the cable core 11. The optical fiber cable 1 according to the present embodiment is a slotless type optical fiber cable and is a cable for air blown installation.

The cable core 11 has a circular shape in a cross-sectional view. The cable core 11 includes a plurality of optical fiber ribbons 10. The outer diameter of the cable core 11 is, for example, 5.8 mm. In the present embodiment, the cable core 11 has 24 optical fiber ribbons 10. The optical fiber ribbon 10 includes 12 optical fibers. The outer diameter of each optical fiber is, for example, 165 μm or more and 250 μm or less, and is relatively thin. The 12 optical fibers are arranged in parallel in a direction orthogonal to a longitudinal direction thereof. Between at least a part of adjacent optical fibers of the optical fiber ribbon 10, a coupling portion in a state in which the adjacent optical fibers are coupled to each other and a non-coupling portion in a state in which the adjacent optical fibers are not coupled may be intermittently provided in the longitudinal direction of the optical fiber. The optical fiber ribbon 10 is an example of the plurality of optical fibers.

The core density obtained by dividing the number of the plurality of optical fibers by the cross-sectional area of the cable is 1.5 core/mm² or more. The optical fiber cable 1 according to the present embodiment has 288 optical fibers in the cable core 11. The cross-sectional area of the cable is 75.39 mm². The core density is 3.8 core/mm².

The tensile strength member 12 is provided along the cable core 11. In the present embodiment, the tensile strength member 12 is helically provided around the cable core 11 in the longitudinal direction of the optical fiber cable 1. The tensile strength member 12 is further provided at one location on the sheath 13 in a cross-sectional view.

The tensile strength member 12 is made of fiber reinforced plastic (FRP). Examples of the fiber reinforced plastic include aramid FRP, glass FRP, and carbon FRP. The tensile strength member 12 has a circular shape in a cross-sectional view. The diameter of the tensile strength member 12 is, for example, 1.8 mm. The diameter of the tensile strength member 12 is larger than the minimum thickness Tmin of the sheath 13, the minimum thickness Tmin will be described later. Further, the ratio of the area of the tensile strength member 12 to the area of the sheath 13 in a cross-sectional view is 0.04 or more.

The Young's modulus of the tensile strength member 12 is 400 MPa or more and 700 MPa or less. The product (the ES product) of the Young's modulus of the tensile strength member 12 and the cross-sectional area of the tensile strength member 12 is 1000 N or more and 10000 N or less.

The tensile strength member 12 does not buckle when the optical fiber cable 1 is bent with a bending radius 10 times the radius of the optical fiber cable 1. For example, in the case of the optical fiber cable 1 having the outer diameter of 9.8 mm described above, the optical fiber cable 12 does not buckle even when the optical fiber cable 1 is bent such that the bending radius becomes 49 mm.

The sheath 13 covers the cable core 11 from the outside and encloses the tensile strength member 12. The base resin of the sheath 13 according to the present embodiment is an ethylene-vinyl acetate copolymer resin (an EVA resin). The sheath 13 may contain a flame-retardant inorganic material. As a flame-retardant inorganic material, the sheath 13 contains, for example, magnesium hydroxide or aluminum hydroxide. The Young's modulus of the sheath 13 according to the present embodiment is 400 MPa or more and 800 MPa or less. The softening point temperature of the sheath 13 is 40 deg-C. or higher and 70 deg-C. or lower.

In a cross-sectional view, the thickness of the sheath 13 is not constant, and the minimum thickness is Tmin. The minimum thickness Tmin of the sheath 13 is the thickness of a sheath portion where the length between the cable core 11 and an outer edge of the optical fiber cable 1 is the smallest. In the present embodiment, the minimum thickness Tmin of the sheath 13 is the thickness of the sheath 13 located on an opposite side to the tensile strength member 12 with the cable core 11 interposed therebetween in a cross-sectional view (FIG. 1). For example, the minimum thickness Tmin of the sheath 13 is 1.3 mm while the diameter of the tensile strength member 12 is 1.8 mm. Thus, the diameter of the tensile strength member 12 is larger than the minimum thickness Tmin of the sheath 13.

In a cross-sectional view, the ratio of the area of the tensile strength member 12 to the area of the sheath 13 is 0.04 or more. For example, when the area of the sheath is 49.0 mm² and the area of the tensile strength member 12 is 2.54 mm², the ratio of the area of the tensile strength member 12 to the area of the sheath 13 is 0.05.

As described above, the optical fiber cable 1 according to the present embodiment includes the cable core 11 including the plurality of optical fiber ribbons 10, the one tensile strength member 12 provided along the cable core 11, and the sheath 13 that covers the cable core 11 from the outside and that encloses the tensile strength member 12. The core density obtained by dividing the number of the plurality of optical fibers by the cross-sectional area of the cable is 1.5 core/mm² or more. Therefore, it is possible to implement the optical fiber cable 1 in which the optical fibers are mounted at a high density.

The tensile strength member 12 is further provided at one location on the sheath 13 in a cross-sectional view. Therefore, when the optical fiber cable 1 is bent, a bending center is closer to the tensile strength member 12, and the distance between the tensile strength member 12 and the bending center is shortened. Therefore, as compared with a case in which the tensile strength member 12 is embedded at two or more locations on the sheath 13, the tensile strength member 12 is less likely to buckle even when the optical fiber cable 1 is bent to a small diameter. Since the optical fiber cable 1 is easily bent to a small diameter, the storability of the optical fiber cable 1 in any space is also improved.

Modification 1

An optical fiber cable 1A according to Modification 1 will be described with reference to FIG. 2. In the configuration shown in FIG. 2, the same components as those shown in FIG. 1 are denoted by the same reference signs, and the description thereof is omitted.

Figure 2:
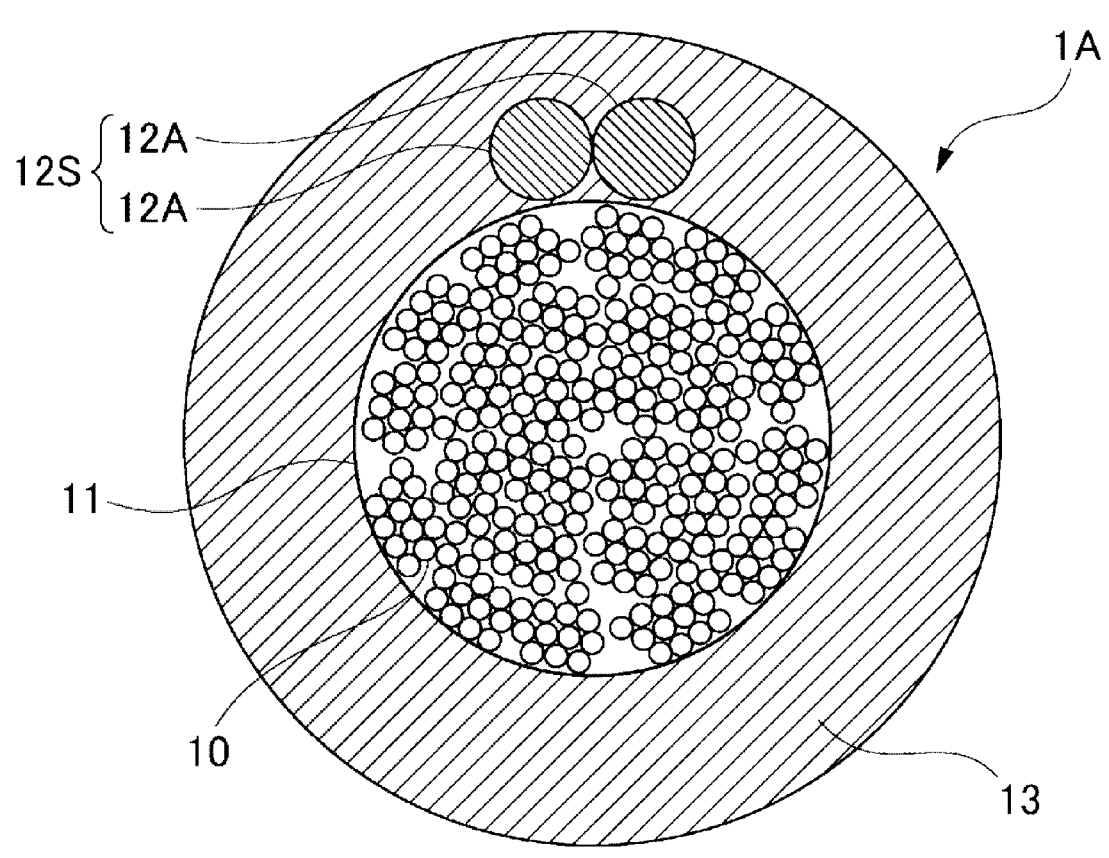
FIG. 2 is a cross-sectional view perpendicular to a longitudinal direction of an optical fiber cable according to a modification.

FIG. 2 is a cross-sectional view perpendicular to a longitudinal direction of the optical fiber cable 1A. While the optical fiber cable 1 shown in FIG. 1 includes one tensile strength member 12, in the optical fiber cable 1A shown in FIG. 2, two tensile strength members 12A are provided at one location on the sheath 13 in a cross-sectional view.

The two tensile strength members 12A are adjacent to each other and form a pair of tensile strength member sets 12S. The pair of tensile strength member sets 12S are provided at one location on the sheath 13. Each of the tensile strength members 12A has a circular shape in a cross-sectional view. The diameter of each of the tensile strength members 12A is, for example, 1.2 mm. Further, the ratio of the area of the tensile strength member 12A to the area of the sheath 13 in a cross-sectional view is 0.04 or more. In the present modification, the cross-sectional area of the cable is 75.4 mm². The area of a cable core is 26.4 mm². Therefore, the area of the sheath 13 is 49.0 mm². The area of the two tensile strength members 12A is 2.26 mm². Therefore, the ratio of the area of the tensile strength member 12A to the area of the sheath 13 in a cross-sectional view is 0.046.

In the optical fiber cable 1A according to the present modification, the two tensile strength members 12A (the pair of tensile strength member sets 12S) are also provided at one location on the sheath 13. Therefore, when the optical fiber cable 1A is bent, a bending center is closer to the two tensile strength members 12A, and the distance between the two tensile strength members 12A and the bending center is shortened. Therefore, the two tensile strength members 12A are less likely to buckle. Since the optical fiber cable 1A is easily bent to a small diameter, the storability of the optical fiber cable 1A in any space is also improved.

Although the present disclosure has been described in detail with reference to the specific embodiments, it is apparent to those skilled in the art that various changes and modifications can be made without departing from the spirit and scope of the present disclosure. In addition, the number, positions, shapes, and the like of the constituent members described above are not limited to those in the embodiment described above, and can be changed to suitable numbers, positions, shapes, and the like in carrying out the present disclosure.

In the above, the tensile strength member 12 is made of fiber reinforced plastic (FRP). However, the tensile strength member 12 is not limited to being made of fiber reinforced plastic (FRP). The tensile strength member 12 may be steel wire. In this case, since the tensile strength member 12 has relatively high rigidity, the tensile strength member 12 is less likely to buckle even when the optical fiber cable 1 is bent.

In the above, the tensile strength member 12 is helically provided around the cable core 11 in the longitudinal direction of the optical fiber cable 1. However, the tensile strength member 12 is not limited to being helically provided. The tensile strength member 12 may be linearly provided along the cable core 11 in the longitudinal direction of the optical fiber cable 1.

Figure 3:
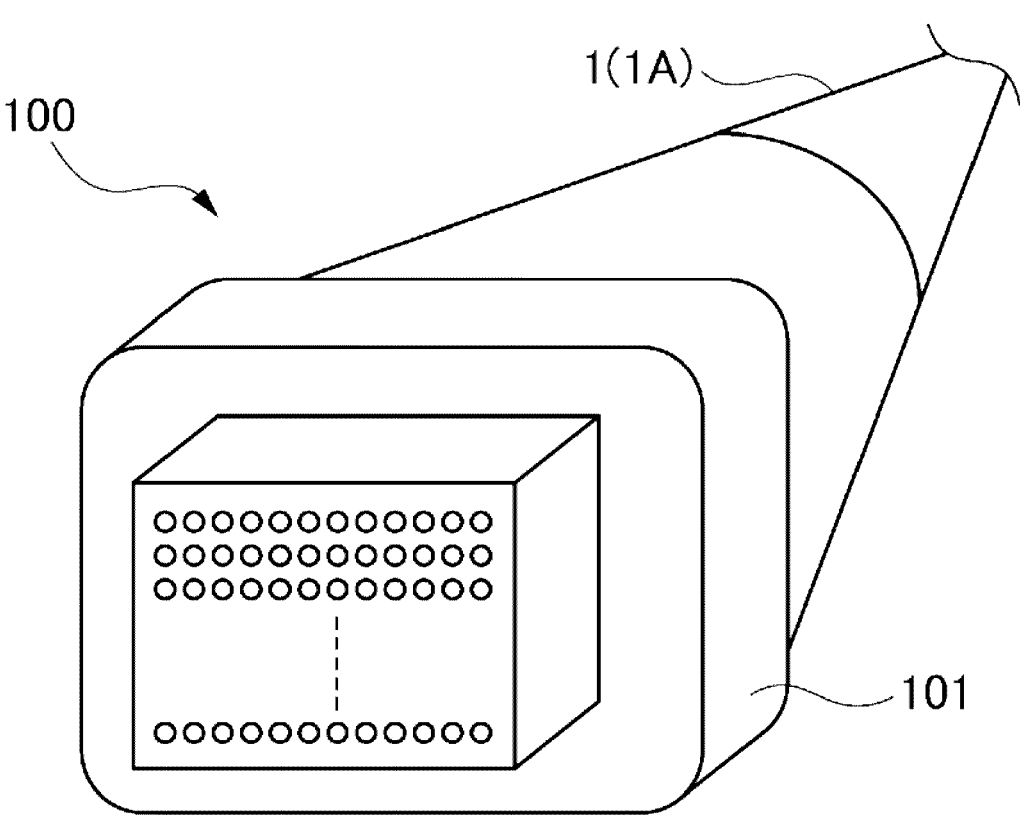
FIG. 3 is a schematic view showing a cable with a connector.

A multi-fiber connector 101 may be provided at one end of the optical fiber cable 1 or the optical fiber cable 1A. FIG. 3 is a schematic view showing a cable 100 with a connector. As shown in FIG. 3, the cable 100 with a connector includes the optical fiber cable 1 and the multi-fiber connector 101 to which a plurality of optical fibers are attached at one end of the optical fiber cable 1. The cable 100 with a connector may include the optical fiber cable 1A instead of the optical fiber cable 1. According to such a configuration, it is possible to facilitate the workability when optically connecting the optical fiber cable 1 or the optical fiber cable 1A.

Evaluation Experiment

In the optical fiber cable 1 according to the embodiment, the presence or absence of the buckling of the tensile strength member 12 was evaluated. The diameter of the optical fiber is 200 μm. It was visually checked whether the tensile strength member 12 buckled when the optical fiber cable 1 was bent such that the bending radius was 150 mm in the environment of 70 deg-C.

Further, the feeding distance and the cable temperature characteristic of the optical fiber cable 1 were evaluated. As a method for evaluating the cable temperature characteristic, the loss was measured when a temperature cycle from −30 deg-C. to +70 deg-C. was applied in a drum state or in a state simulating laying, and it was evaluated as "good" when a loss variation Δα during a test was 0.15 dB/km or less.

As a method for evaluating the feeding distance, a microduct pressure feeding test specified by the International Electrotechnical Commission (IEC) was used (IEC 60794-1-21 Method E24). In the feeding test, a general-purpose microduct was used. The total feeding distance in the duct is set to 1000 m or more, and the duct is folded back at each 100 m point. The radius of curvature of the duct is 40 times the outer diameter of the duct. The pressure in the duct is 1.3 MPa to 1.5 MPa.

In the optical fiber cable 1A according to the modification, the presence or absence of the buckling of the tensile strength member 12A, the feeding distance, and the cable loss characteristic were evaluated. Evaluation results are shown in Table 1.

TABLE 1

| Cable structure | Optical fiber cable Z | Optical fiber cable 1 | Optical fiber cable 1A |
|---|---|---|---|
| Structure of sheath | Flame-retardant inorganic material Young's modulus of 500 MPa Softening temperature of 70 deg-C. Average thickness of 2.0 mm (maximum thickness: 2.3 mm, minimum thickness: 1.7 mm) | Flame-retardant inorganic material Young's modulus of 500 MPa Softening temperature of 70 deg-C. Average thickness of 2.0 mm (maximum thickness: 2.7 mm, minimum thickness: 1.3 mm) | Flame-retardant inorganic material Young's modulus of 500 MPa Softening temperature of 70 deg-C. Average thickness of 2.0 mm (maximum thickness: 2.3 mm, minimum thickness: 1.7 mm) |

TABLE 1-continued

| Cable structure | Optical fiber cable Z | Optical fiber cable 1 | Optical fiber cable 1A |
|---|---|---|---|
| Structure of tensile strength member | Aramid FRP Diameter of 0.5 mm 4 pairs (8 in total) are arranged at equal intervals at 4 locations | Glass FRP Diameter of 1.8 mm 1 is provided at 1 location | Glass FRP Diameter of 1.2 mm 1 pair (2 in total) are provided at 1 location |
| Presence or absence of buckling of tensile strength member | Present | Absent | Absent |
| Temperature characteristic | Good (0.089) | Good (0.093) | Good (0.100) |
| Feeding distance | 1.2 km | 1.1 km | 1.1 km |

In Table 1, an optical fiber cable Z is a comparative example. The optical fiber cable Z is a slotless type cable. In a cross-sectional view, four pairs of tensile strength member sets are arranged at equal intervals at four locations on a sheath. The tensile strength members are made of aramid FRP and have a diameter of 0.5 mm. In the optical fiber cable Z, among the four pairs of tensile strength member sets, the tensile strength member set corresponding to the inner side of the bending buckled. The temperature characteristic was "good". It was confirmed that the feeding distance of the optical fiber cable Z was 1000 m or more.

As shown in Table 1, the buckling of tensile strength member 12 of the optical fiber cable 1 was not confirmed. The temperature characteristic of the optical fiber cable 1 was "good". Further, it was confirmed that the feeding distance of the optical fiber cable 1 was 1000 m or more. From the above, it was confirmed that the optical fiber cable 1 has a good temperature characteristic and a good feeding distance, and that the configuration in which one tensile strength member 12 is provided at one location on the sheath 13 makes the tensile strength member 12 less likely to buckle.

Similarly, the buckling of the tensile strength member 12A of the optical fiber cable 1A was not confirmed. The temperature characteristic of the optical fiber cable 1A was "good". Further, it was confirmed that the feeding distance of the optical fiber cable 1A was 1000 m or more. From the above, it was confirmed that the optical fiber cable 1A has a good temperature characteristic and a good feeding distance, and that the configuration in which one tensile strength member set 12S (a pair of tensile strength members 12A) is provided at one location on the sheath 13 also makes the tensile strength member 12A less likely to buckle.

REFERENCE SIGNS LIST

1, 1A: optical fiber cable

10: optical fiber ribbon

11: cable core

12, 12A: tensile strength member

13: sheath

100: cable with connector

101: multi-fiber connector

Tmin: minimum thickness of sheath

What is claimed is:

1. An optical fiber cable comprising:

a cable core including a plurality of optical fibers;

a plurality of tensile strength members each provided along the cable core; and a sheath configured to cover the cable core from an outside and enclose the tensile strength member, wherein the plurality of tensile strength members is provided adjacent to each other at only one location on the sheath in a cross-sectional view, and wherein a core density obtained by dividing the number of the plurality of optical fibers by a cross-sectional area of the cable is 1.5 core/$mm^2$ or more.

2. The optical fiber cable according to claim 1, wherein the tensile strength member is fiber reinforced plastic (FRP).

3. The optical fiber cable according to claim 1, wherein a Young's modulus of the tensile strength member is 400 MPa or more and 700 MPa or less.

4. The optical fiber cable according to claim 1, wherein a product (an ES product) of a Young's modulus and a cross-sectional area of the tensile strength member is 1000 N or more and 10000 N or less.

5. The optical fiber cable according to claim 1, wherein the tensile strength member is steel wire.

6. The optical fiber cable according to claim 1, wherein a diameter of the tensile strength member is larger than a minimum thickness of the sheath.

7. The optical fiber cable according to claim 1, wherein, when the optical fiber cable is bent at a bending radius 10 times a radius of the optical fiber cable, the tensile strength member does not buckle.

8. The optical fiber cable according to claim 1, wherein the sheath contains a flame-retardant inorganic material.

9. The optical fiber cable according to claim 1, wherein the sheath is an ethylene-vinyl acetate copolymer resin (an EVA resin).

10. The optical fiber cable according to claim 1, wherein a Young's modulus of the sheath is 400 MPa or more and 800 MPa or less.

11. The optical fiber cable according to claim 1, wherein a softening point temperature of the sheath is 40 deg-C or higher and 70 deg-C or lower.

12. The optical fiber cable according to claim 1, wherein the tensile strength member is helically provided around the cable core in a longitudinal direction of the optical fiber cable.

13. The optical fiber cable according to claim 1, wherein a ratio of an area of the tensile strength member to an area of the sheath in the cross-sectional view is 0.04 or more.

14. The optical fiber cable according to claim 1, wherein the optical fiber cable is a cable for air blown installation.

15. A cable with a connector, the cable comprising: the optical fiber cable according to claim 1; and a multi-fiber connector to which the plurality of optical fibers are attached at one end of the optical fiber cable.

16. The optical fiber cable according to claim 1, wherein the plurality of tensile strength members is in contact with each other.

\*   \*   \*   \*   \*